(12) United States Patent
Jo

(10) Patent No.: US 8,042,426 B2
(45) Date of Patent: Oct. 25, 2011

(54) STEERING COLUMN OF VEHICLES

(75) Inventor: Sang Min Jo, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 175 days.

(21) Appl. No.: 11/705,231

(22) Filed: Feb. 12, 2007

(65) Prior Publication Data

US 2008/0134827 A1 Jun. 12, 2008

(30) Foreign Application Priority Data

Dec. 7, 2006 (KR) .................. 10-2006-0124097

(51) Int. Cl.
*B62D 1/18* (2006.01)
*B62D 1/187* (2006.01)
(52) U.S. Cl. ............................. 74/493; 74/492; 280/775
(58) Field of Classification Search ............... 74/492, 74/493, 497; 280/775
See application file for complete search history.

(56) References Cited

U.S. PATENT DOCUMENTS

| | | | | | |
|---|---|---|---|---|---|
| 4,541,298 | A | * | 9/1985 | Strutt | 74/493 |
| 5,377,555 | A | * | 1/1995 | Hancock | 74/493 |
| 5,605,351 | A | * | 2/1997 | Higashino | 280/775 |
| 5,607,184 | A | * | 3/1997 | Barton | 280/775 |
| 5,743,150 | A | * | 4/1998 | Fevre et al. | 74/493 |
| 6,952,979 | B2 | * | 10/2005 | Cartwright et al. | 74/493 |
| 2005/0104353 | A1 | * | 5/2005 | Ikeda et al. | 280/775 |

FOREIGN PATENT DOCUMENTS

| | | |
|---|---|---|
| JP | 2001-191927 A | 7/2001 |
| JP | 2003-276614 A | 10/2003 |

* cited by examiner

*Primary Examiner* — James Pilkington
*Assistant Examiner* — Thomas Diaz
(74) *Attorney, Agent, or Firm* — Morgan, Lewis & Bockius LLP

(57) ABSTRACT

A steering column includes a steering shaft connected to a steering wheel; a block, housing the steering shaft; a column tube, housing the block; a main housing, mounted at an exterior of the column tube, and including a telescoping guide hole for a telescoping operation, and a fixing portion for pressing the column tube; a tilt bracket mounted on the main housing and including a tilt guide hole for a tilting operation; a fixing unit combined with the block through the tilt bracket and the main housing, for fixing a position of the column tube; and an operation lever for controlling an operation of the fixing unit, the operation lever being disposed at an exterior of the tilt bracket and connected to the fixing unit.

5 Claims, 11 Drawing Sheets

US 8,042,426 B2

STEERING COLUMN OF VEHICLES

CROSS-REFERENCE TO RELATED APPLICATION

This application claims priority to and the benefit of Korean Patent Application No. 10-2006-0124097 filed in the Korean Intellectual Property Office on Dec. 7, 2006, the entire contents of which are incorporated herein by reference.

BACKGROUND OF THE INVENTION (a) Field of the Invention

The present invention relates to a steering column of a vehicle. More particularly, the present invention relates to a steering column of a vehicle that reduces the chance of serious injury to the knees of a driver in the case of an accident.

(b) Description of the Related Art

Typically, a bracket for a telescoping operation of a steering column is disposed at a lower portion of the steering column. Therefore, when an accident occurs, there is a high possibility that the driver's knees hit the bracket, causing serious injury to the knees.

To solve such a problem, a foam plastic has been mounted on a shroud that covers the steering column. However, there may not be sufficient space in the shroud, and production costs are increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a steering column of a vehicle with reduced chances of serious injury to a driver's knees in the case of an accident. Embodiments of the present invention perform tilting and telescoping operations without the need for a bracket near the driver's knees.

Embodiments of the prevent invention provide a steering column, including: a steering shaft connected to a steering wheel; a block, housing the steering shaft; a column tube, housing the block; a main housing, mounted at an exterior of the column tube, and including a telescoping guide hole for a telescoping operation, and a fixing portion for pressing the column tube; a tilt bracket mounted on the main housing and including a tilt guide hole for a tilting operation; a fixing unit combined with the block through the tilt bracket and the main housing, for fixing a position of the column tube; and an operation lever for controlling an operation of the fixing unit, the operation lever being disposed at an exterior of the tilt bracket and connected to the fixing unit.

The fixing unit may include: a first hinge shaft disposed at a first side of the tilt bracket and combined with the block through the tilt guide hole and the telescoping guide hole; a second hinge shaft disposed at a second side of the tilt bracket and combined with the block through the tilt guide hole and the telescoping guide hole; an outer cam provided at a first end of the operation lever and having a first protruding portion at a side thereof, the second hinge shaft being inserted therein such that the outer cam rotates around the second hinge shaft; an inner cam with a first side inserted in the tilt guide hole and contacting the fixing portion, and a second side having a second protruding portion corresponding to the first protruding portion, the second hinge shaft being inserted in the inner cam; and a nut for restricting an axial movement of the outer cam.

The steering column may further include a needle bearing between the outer cam and the nut. The tilt guide hole may restrict rotation of the inner cam. The inner cam may slide along the second hinge shaft by the sum of the heights of the first and second protruding portions, and the inner cam may press the fixing portion when the operation lever is rotated. The fixing portion may further include a part fixed to the main housing and another part moved by the inner cam such that the fixing portion presses the column tube. A gap may be provided between the block and the column tube.

DETAILED DESCRIPTION OF THE PREFERRED EMBODIMENTS

An exemplary embodiment of the present invention will hereinafter be described in detail with reference to the accompanying drawings.

A steering column 100 of a vehicle according to an exemplary embodiment of the present invention is provided with a steering shaft 150 that is connected to a steering wheel (not shown).

Figure 1:
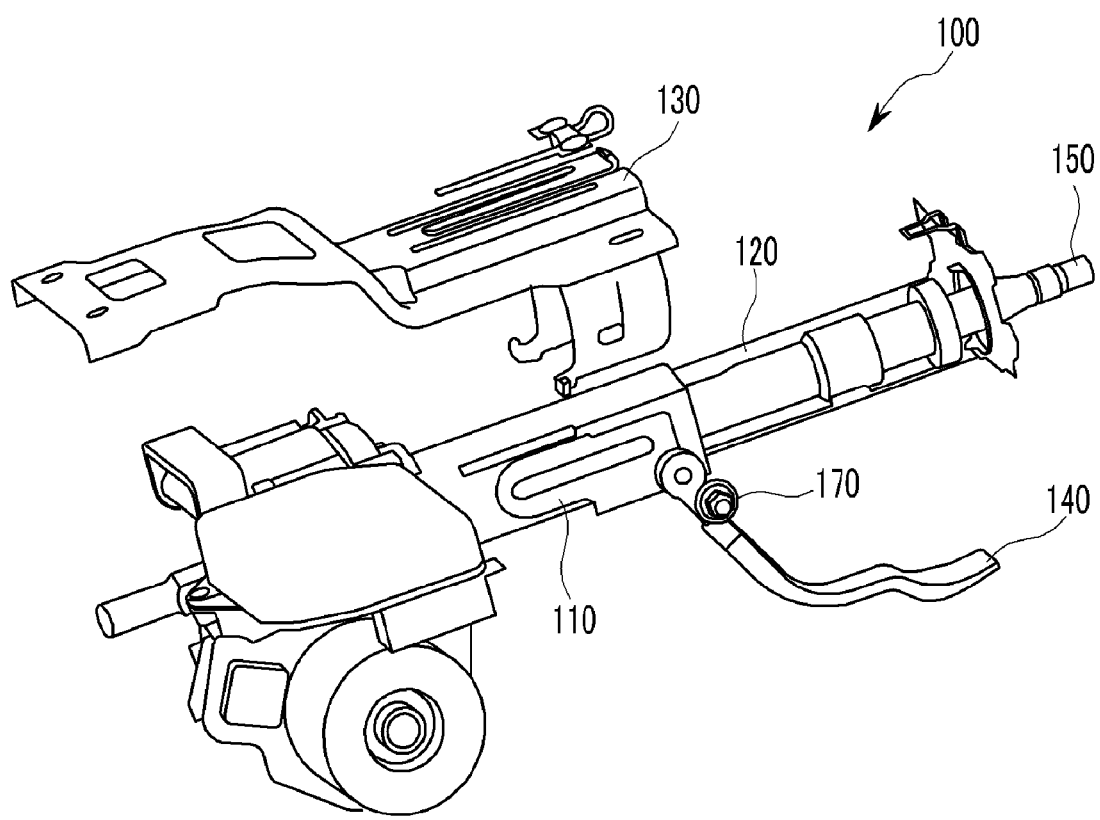
FIG. 1 is an exploded assembly view of a steering column of a vehicle according to an exemplary embodiment of the present invention.
Figure 2:
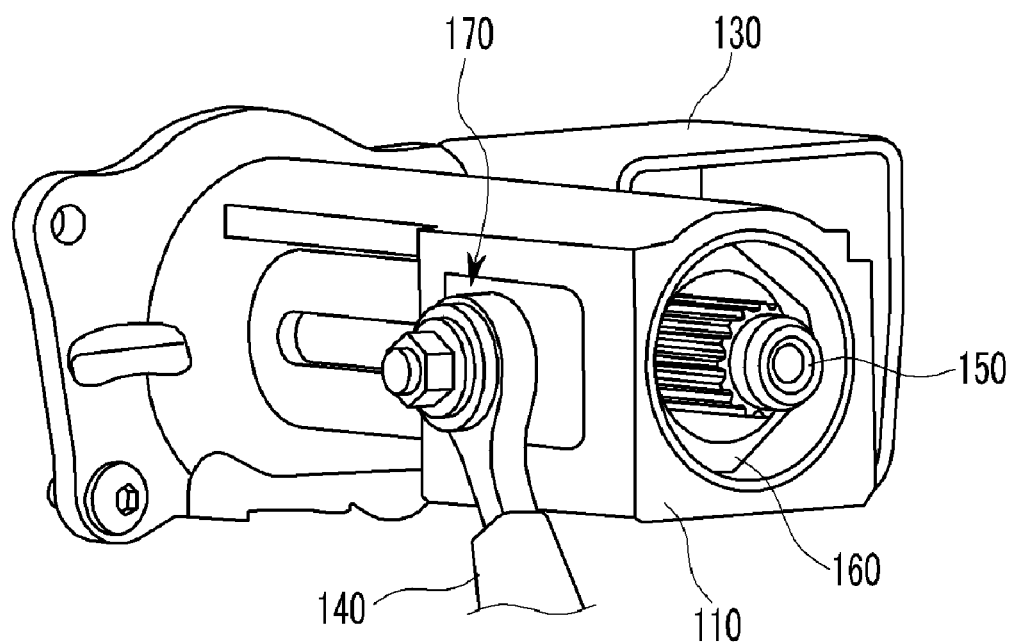
FIG. 2 is a partial perspective view of a steering column of a vehicle according to an exemplary embodiment of the present invention.
Figure 3:
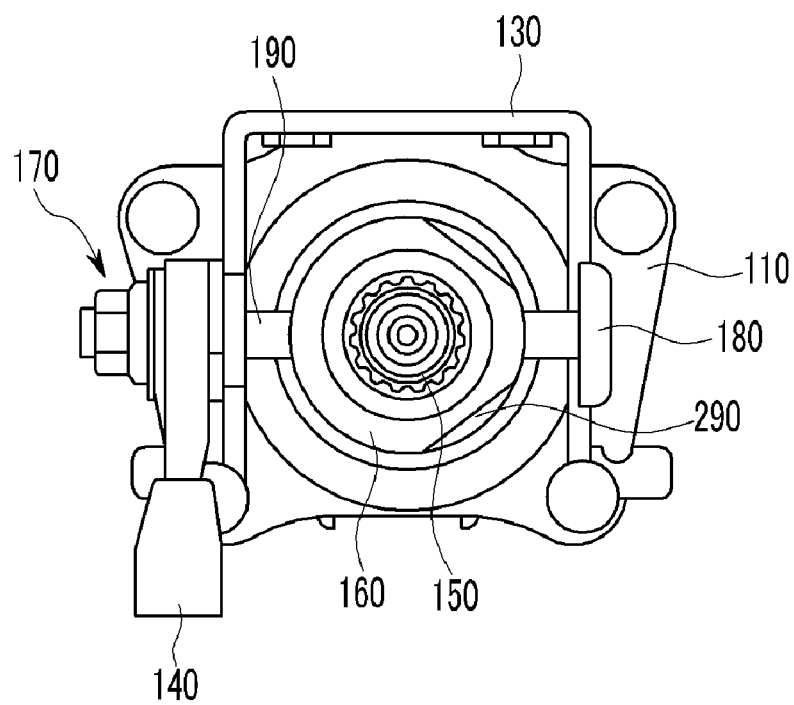
FIG. 3 is a front view of a steering column of a vehicle according to an exemplary embodiment of the present invention.

As shown in FIG. 1 to FIG. 3, the steering column 100 includes a block 160, a column tube 120, a main housing 110, a tilt bracket 130, an operation lever 140, and a fixing unit 170.

The block 160 houses the steering shaft 150. The block 160 is substantially pipe-shaped and a portion of an exterior circumference of the block 160 is chamfered.

The column tube 120 houses the block 160. A gap 290 is provided between the column tube 120 and the chamfered portion of the exterior circumference of the block 160. The gap 290 prevents stress between the block 160 and the column tube 120 that is generated as a consequence of a difference between expansion coefficients of the block 160 and the column tube 120.

Figure 4:
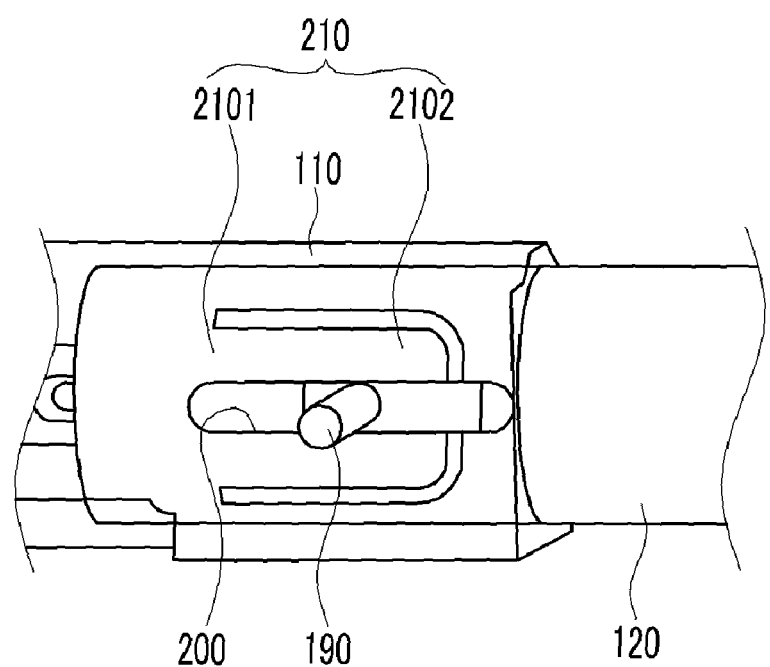
FIG. 4 is a schematic diagram showing a telescoping operation of a steering column of a vehicle according to an exemplary embodiment of the present invention.

The main housing 110 is mounted at an exterior of the column tube 120. As shown in FIG. 4, the main housing 110 is provided with a telescoping guide hole 200 along an axial direction thereof, and a fixing portion 210. A part 2101 of the fixing portion 210 is fixed to the main housing 110. The fixing portion 210 can move in the radial direction of the main housing 110 and press the column tube 120.

Figure 5:
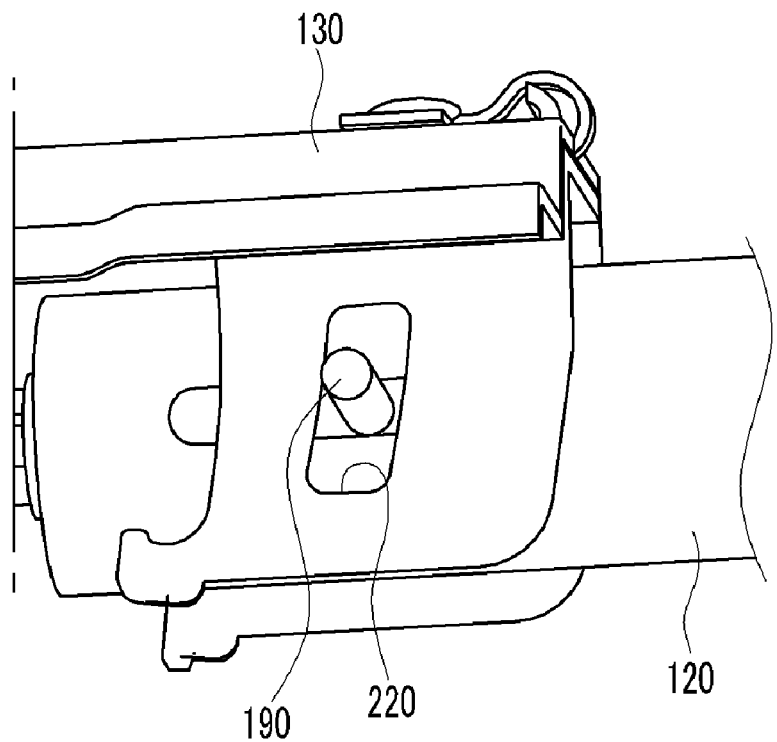
FIG. 5 is a schematic diagram showing a tilting operation of a steering column of a vehicle according to an exemplary embodiment of the present invention.

Referring to FIG. 5, the tilt bracket 130 is mounted on the main housing 110. Sides of the tilt bracket 130 are bent and surround the main housing 110. A tilt guide hole 220 is vertically provided at the sides of the tilt bracket 130.

Referring to FIG. 3, the operation lever 140 is disposed at an exterior of the tilt bracket 130. The operation lever 140 is connected to the fixing unit 170 and controls a fixing operation of the fixing unit 170.

Figure 6:
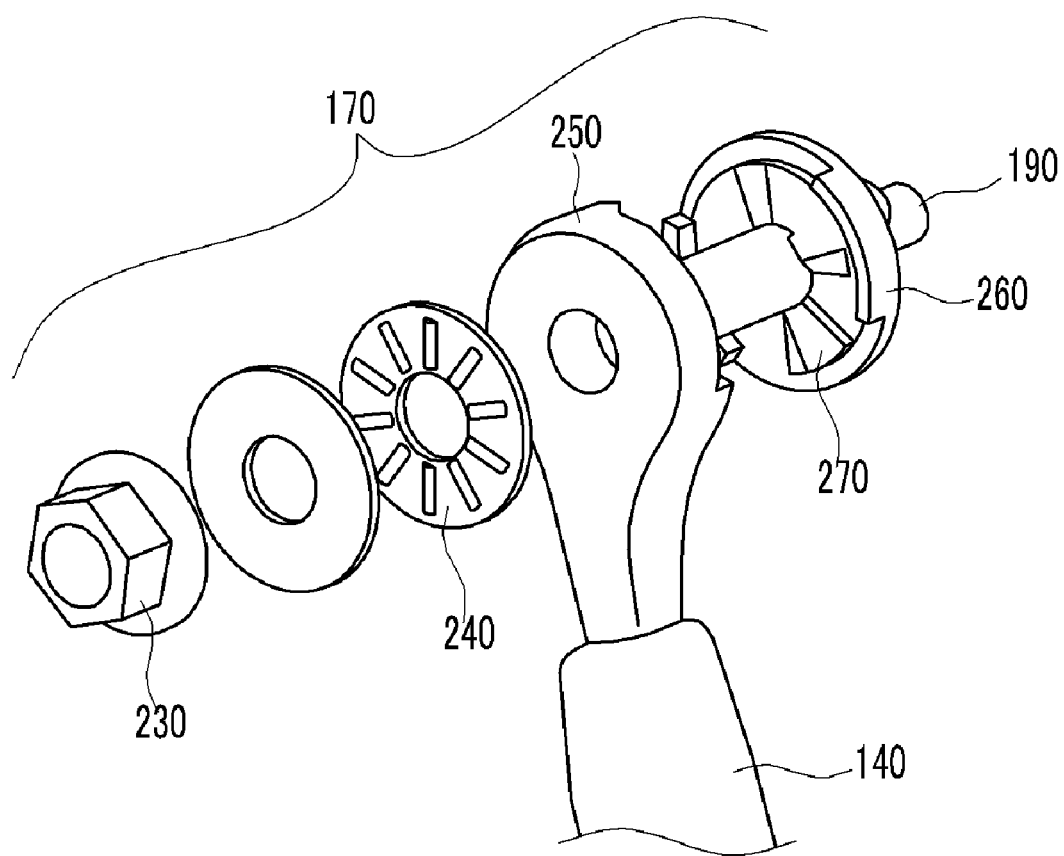
FIG. 6 is an exploded assembly view of a fixing unit according to an exemplary embodiment of the present invention.

The fixing unit 170, as shown in FIG. 3 and FIG. 6, includes a first hinge shaft 180, a second hinge shaft 190, an outer cam 250, an inner cam 260, a nut 230, and a needle bearing 240.

The first hinge shaft 180 is disposed at one side of the tilt bracket 130 and combined with the block 160 through the tilt guide hole 220 and the telescoping guide hole 200.

The second hinge shaft 190 is disposed at the opposite side of the tilt bracket 130 and combined with the block 160 through the tilt guide hole 220 and the telescoping guide hole 200.

The first and second hinge shafts 180 and 190 are screwed to respective sides of the block 160.

Therefore, the first and second hinge shafts 180 and 190 move along the tilt guide hole 220 and the telescoping guide hole 200 and control a position of the steering column 100.

The outer cam 250 is provided at one end of the operation lever 140. The second hinge shaft 190 penetrates the outer cam 250, and the outer cam 250 can rotate around the second hinge shaft 190. In addition, a plurality of first protruding portions 280 are provided at one surface of the outer cam 250. The first protruding portions 280 have slanted surfaces. The nut 230 restricts an axial movement of the outer cam 250.

The inner cam 260 has one side inserted in the tilt guide hole 220, and the tilt guide hole 220 restricts a rotational movement of the inner cam 260. One side surface of the inner cam 260 contacts a part 2102 of the fixing portion 210 of the main housing 110. Therefore, as the inner cam 260 moves in an axial direction of the second hinge shaft 190, the inner cam 260 presses the fixing portion 210 and fixes the main housing 110 to the column tube 120.

Second protruding portions 270, corresponding to the first protruding portions 280, are provided at the other side of the inner cam 260. The second protruding portions 290 have slanted surfaces corresponding to the slanted surfaces of the first protruding portions 280.

In addition, the second hinge shaft 190 is inserted in the inner cam 260, and the inner cam 260 slides in the axial direction of the second hinge shaft 190.

The nut 230 is screwed to the second hinge shaft 190. The nut 230 restricts the axial movement of the outer cam 250.

The needle bearing 240 is interposed between the nut 230 and the outer cam 250, and facilitates the rotational movement of the outer cam 250.

Hereinafter, referring to the accompanying drawings, an operation of the steering column of the vehicle according to an exemplary embodiment of the present invention will be described in detail.

When a driver unlocks the operation lever 140 and moves the second hinge shaft 190 along the tilt guide hole 220 and the telescoping guide hole 200, the column tube 120 also moves together with the second hinge shaft 190. Therefore, the driver can control a position of the steering wheel according to the driver's figure.

Figure 7:
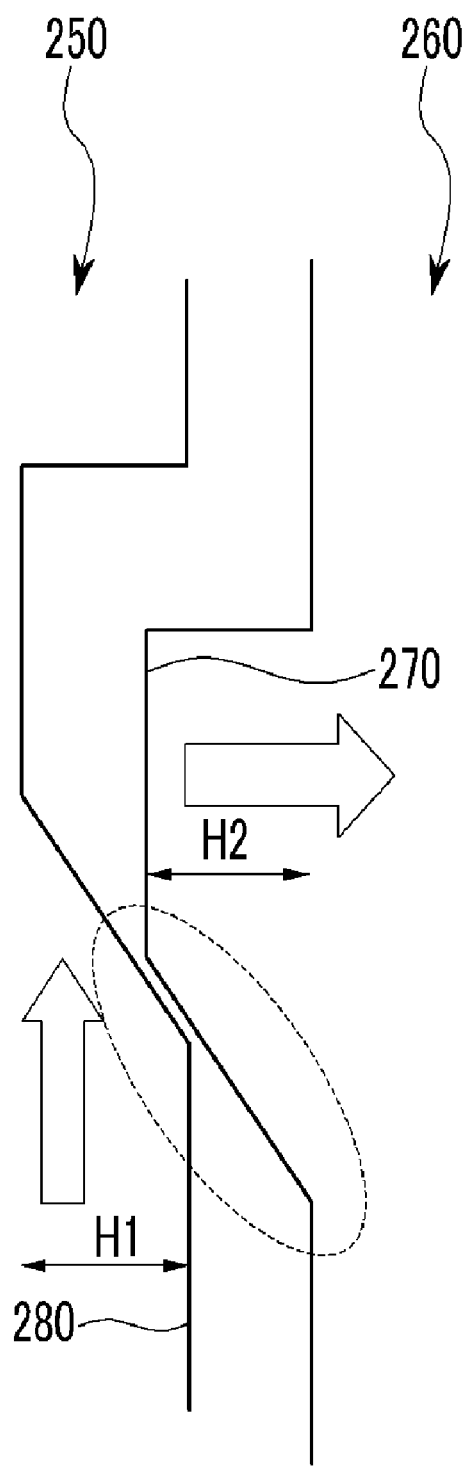
FIG. 7 is a schematic diagram showing an operation of a fixing unit according to an exemplary embodiment of the present invention.
Figure 8:
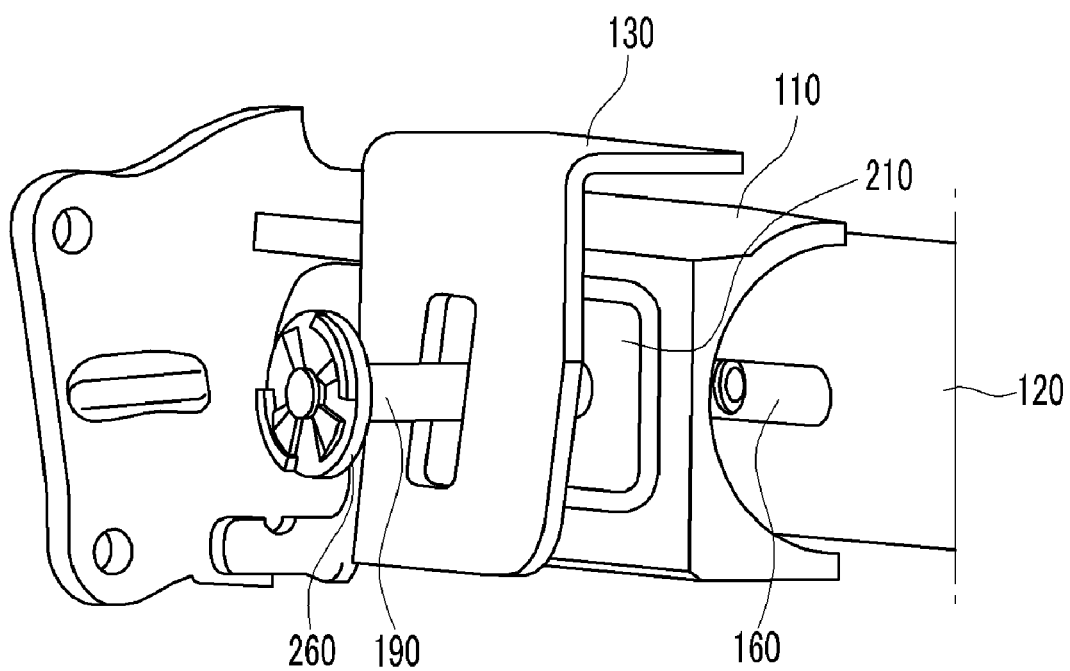
FIG. 8 is an exploded assembly view showing that a tilt bracket, a main housing, and a column tube are assembled with each other according to an exemplary embodiment of the present invention.
Figure 9:
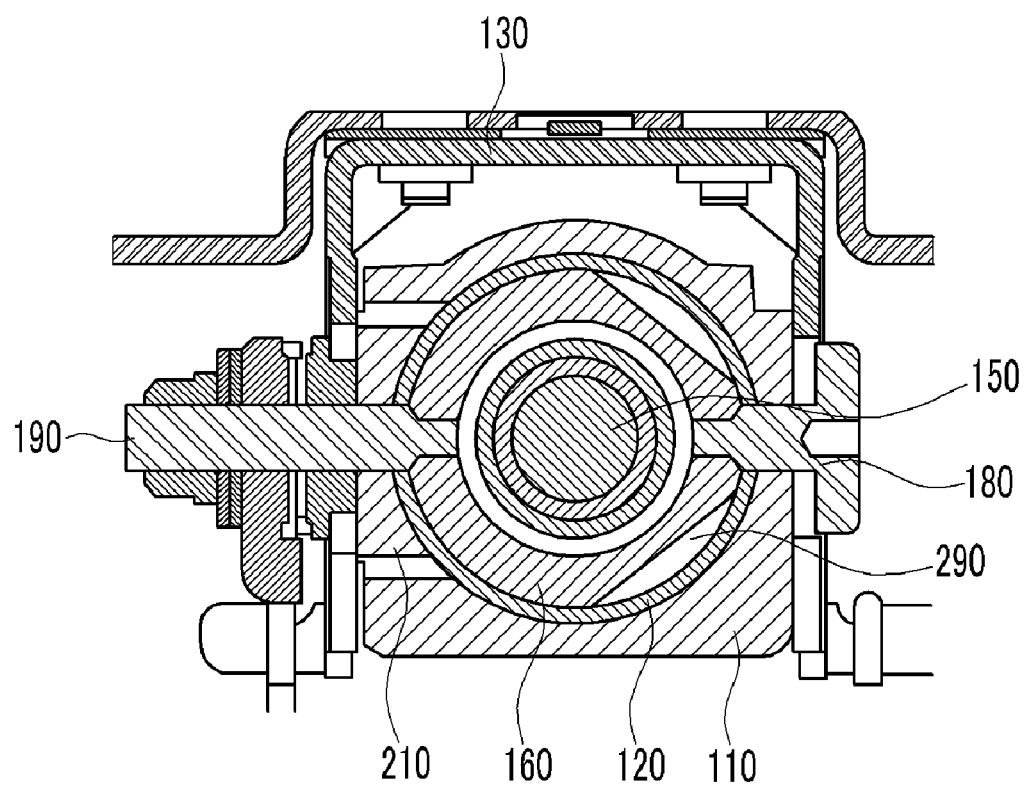
FIG. 9 is a cross-sectional view of a steering column of a vehicle according to an exemplary embodiment of the present invention.
Figure 10:
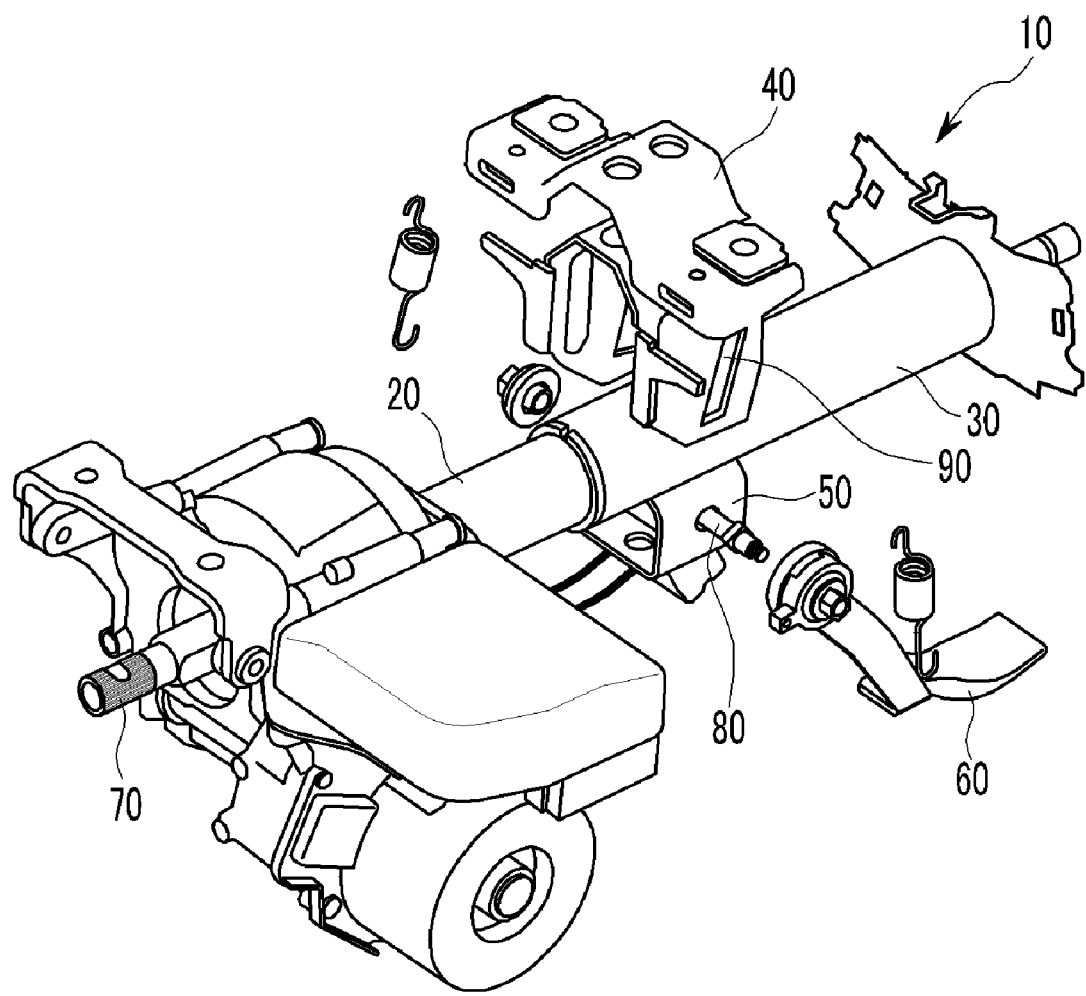
FIG. 10 is an exploded assembly view of a steering column of a vehicle according to a conventional art.
Figure 11:
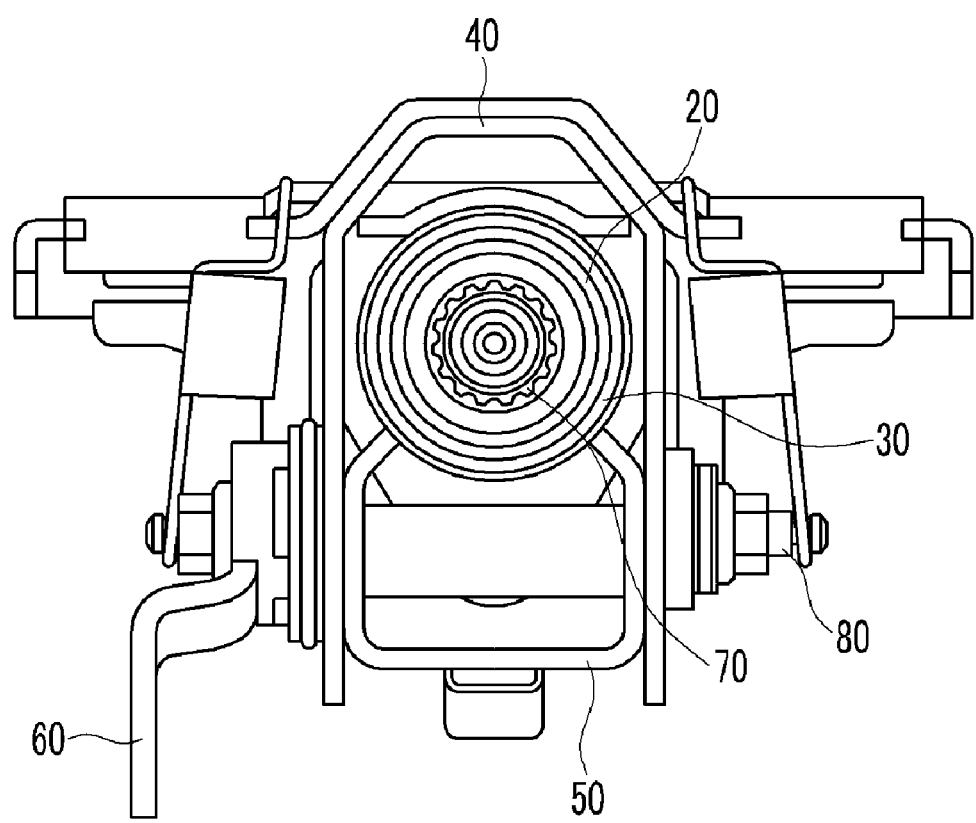
FIG. 11 is a front view of a steering column of a vehicle according to a conventional art.

After that, the driver rotates and locks the operation lever 140. Consequently, the outer cam 250 rotates and the slanted surfaces of the first protruding portions 280 slide along the slanted surfaces of the second protruding portions 270. As shown in FIG. 9, since the rotational movement of the inner cam 260 is restricted, the inner cam 260 moves along the second hinge shaft 190 and presses part 2102 of the fixing portion 210 of the main housing 110. That is, as shown in FIG. 7, the inner cam 260 slides along the second hinge shaft 190 and presses the fixing portion 210 by the sum of the height H1 of the first protruding portions 280 and the height H2 of the second protruding portions 270. In this case, as shown in FIG. 9, the fixing portion 210 moves to the right in the drawing and presses the column tube 120. Therefore, the column tube 120 is strongly fastened to the block 160. Therefore, the main housing 110 is fixed to the column tube 120, and the column tube 120 is fixed to the block 160.

In addition, the inner cam 260 slides along the second hinge shaft 190 and presses the tilt bracket 130. Therefore, the tilt bracket 130 is fixed to the main housing 110. Finally, the position of the steering column 100 is fixed.

According to the present invention, tilting and telescoping operations of the steering column can be performed without the need for a bracket near a driver's knee, reducing the chances of injury.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A steering column, comprising:
    a steering shaft configured to be connected to a steering wheel;
    a block substantially encircling the steering shaft and having concentric cylindrical inner and outer surfaces;
    a column tube substantially encircling the block;
    a main housing, mounted at an exterior of the column tube, and comprising a telescoping guide hole for a telescoping operation, and a fixing portion for pressing the column tube;
    a tilt bracket, mounted on the main housing, and comprising a tilt guide hole for a tilting operation;
    a fixing unit, combined with the block through the tilt bracket and the main housing, for fixing a position of the column tube; and
    an operation lever for controlling an operation of the fixing unit, the operation lever being disposed at an exterior of the tilt bracket and connected to the fixing unit;
    wherein the fixing unit includes:
    a first hinge shaft, disposed at a first side of the tilt bracket, and combined with the block through the tilt guide hole and the telescoping guide hole;
    a second hinge shaft, disposed at a second side of the tilt bracket, and combined with the block through the tilt guide hole and the telescoping guide hole;
    an outer cam, provided at a first end of the operation lever, and comprising a first protruding portion at a side thereof, the second hinge shaft being inserted therein such that the outer cam rotates around the second hinge shaft;

an inner cam, comprising a first side inserted in the tilt guide hole and contacting the fixing portion, and a second side comprising a second protruding portion corresponding to the first protruding portion, the second hinge shaft being inserted in the inner cam, wherein the inner cam slides along the second hinge shaft by a distance substantially equal to a sum of heights of the first and second protruding portions, and the inner cam presses the fixing portion when the operation lever is rotated such that the column tube is frictionally engaged to both the main housing and a cylindrical outer surface of the block; and a nut for restricting an axial movement of the outer cam; and wherein the fixing portion is coupled to the main housing and moved by the inner cam such that the fixing portion presses the column tube.

2. The steering column of claim 1, further comprising a needle bearing disposed between the outer cam and the nut.

3. The steering column of claim 1, wherein the tilt guide hole restricts a rotation of the inner cam.

4. The steering column of claim 1, further comprising a gap between the block and the column tube.

5. The steering column of claim 1, wherein the fixing portion, the column tube and the block are aligned sequentially toward the steering shaft.

* * * * *